Figures 1, 2:
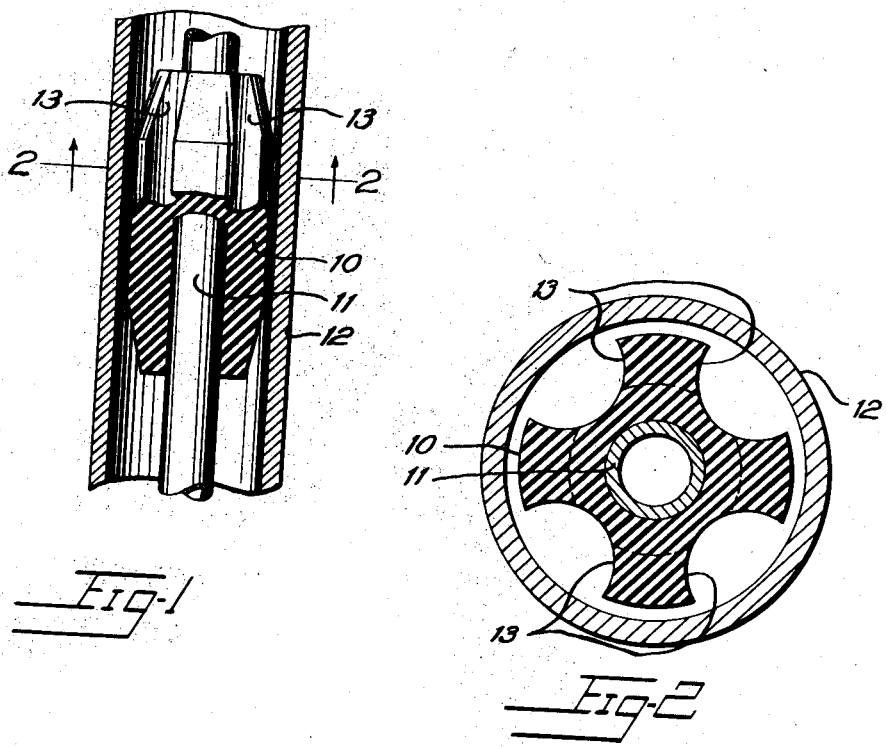

April 11, 1939.  D. R. ANDERSON  2,153,787
SUCKER-ROD GUARD
Filed July 16, 1937

Inventor
David R. Anderson
By Willis F. Avery
Att'y

Patented Apr. 11, 1939

2,153,787

UNITED STATES PATENT OFFICE 2,153,787

SUCKER-ROD GUARD

David R. Anderson, Dallas, Tex., assignor to The B. F. Goodrich Company, New York, N. Y., a corporation of New York Application July 16, 1937, Serial No. 154,015

1 Claim. (Cl. 308—4)

This invention relates to pumping apparatus, and has among its objects to provide sucker-rod guards which will prevent the rod from contacting the well casing, and to provide a guard which will contain no metal or other material which would be injurious to pumping equipment should the guard break and become engaged therein.

It is practically impossible to keep the bore of a deep well either straight or vertical. It is also found that sucker rods have a tendency to bend or twist on the downward stroke. It is necessary, therefore, to place guards every few yards along the rod and to take special care to provide protection in crooked parts of the well in order to avoid abrasion between the rod and the casing. Many types of guards have been proposed, but they have not been entirely satisfactory. Many of the guards contained metal parts which ruined valuable pumping equipment when the guards broke and they were drawn into the machinery with the oil. Attempts were made to make the guards entirely of rubber, but in oil wells the rubber softened and swelled and the guards soon slipped on the rods and had to be replaced.

I have discovered that excellent guards may be made of plasticized polyvinyl halides. Besides being oil-resistant, the guards present good bearing surfaces and are very resistant to abrasion. They are simple to manufacture, have extremely long life, and do not injure machinery in which they may accidentally become engaged.

In the accompanying drawing, Fig. 1 shows a perspective view, partly cut away and in section, of a guard installed on a sucker-rod, and Fig. 2 shows a section on the line 2—2.

Referring to the drawing, the guard 10 is mounted upon the sucker rod 11 in the casing 12. The longitudinal grooves 13, 13 provide passageways for the flow of the oil.

The guards are conveniently made by preparing a mixture of gamma polyvinyl chloride 75 parts and tricresyl phosphate 25 parts. This composition is extruded from an appropriate die at about 300° F., cut to length, and chamfered at both ends.

Rubber sucker-rod guards have been made with their inside diameter smaller than the outside diameter of the rod over which it was to be forced. These guards were very hard to apply, and they soon loosened due to the softening effect of the oil upon the rubber. I make the inside diameter of the guard about the same size as the outside diameter of the rod so that the guard grips the rod loosely and is easily applied. The oil extracts some of the plasticizer from the polyvinyl chloride causing it to shrink and grip the rod very tightly. Thus, my guards tighten on the rod instead of loosening, and their length of service is many times that of the rubber guards.

Though I prefer to use tricresyl phosphate as the plasticizer for the polyvinyl chloride, other well known materials such as dibutyl phthalate, butyl phthalyl butyl glycollate, o-nitro diphenyl ether, etc., may be used with satisfactory results.

Other substances besides the plasticizer may be added to the polyvinyl chloride to vary the properties of the finished product. These additional substances include carbon black, zinc oxide, clay, fibrous materials such as asbestos and wood flour, and other pigments and fillers commonly used in the rubber and plastics industries.

While I have herein disclosed specific details of my invention, I do not intend to limit myself wholly thereto, for materials having equivalent properties may be substituted and the proportions of materials used may be changed without exceeding the spirit and scope of the appended claim.

I claim:

A sucker-rod guard for oil wells consisting of a ring made of a composition comprising a gamma polyvinyl chloride and plasticizer slightly soluble in oil, whereby said ring is caused to grip the sucker-rod when the oil extracts the plasticizer and causes the ring to shrink.

DAVID R. ANDERSON.